United States Patent Office 2,745,862
Patented May 15, 1956

2,745,862

PRODUCTION OF DIALKYL HYDROGEN PHOSPHITES

Everett E. Gilbert, Flushing, and Julian A. Otto, Long Island City, N. Y., assignors to Allied Chemical & Dye Corporation, New York, N. Y., a corporation of New York No Drawing. Application June 20, 1952, Serial No. 294,732

7 Claims. (Cl. 260—461)

This invention relates to the manufacture of dialkyl phosphites and particularly to the manufacture of dimethyl phosphite.

In the past, it has been proposed to prepare dimethyl phosphite by reaction of phosphorus trichloride with methanol. However, this reaction involves a highly corrosive system and formation of a toxic, flammable gas, both of which are undesirable in commercial practice.

It is an object of the present invention to prepare dialkyl phosphites in a simple and easy manner without the employment of reagents of a highly corrosive nature or production of by-products injurious to ordinary materials of construction.

In accordance with the present invention, it has been found that a dialkyl phosphite may be readily prepared by reaction of a dialkyl sulfate with a monohydrogen alkali metal phosphite in the presence of an acid-binding agent; for example, an organic nitrogen base. The reaction proceeds at relatively low temperatures and without the production of corrosive by-products. Thus it may be carried out in standard commercial apparatus constructed of relatively easily corroded materials, such as iron and carbon steels, as well as in corrosion-resistant equipment such as nickel, copper, lead, chromium iron alloys, glass, and the like. The reaction is initiated at temperatures as low as 30° C. However, after it has proceeded sufficiently to substantially dilute the reactants, it is desirable to accelerate the reaction by heating the reaction mixture to temperatures from 70° C. to 200° C., preferably 70° to 160° C. The proces is especially applicable to production of dimethyl hydrogen phosphite by reaction of dimethyl sulfate and disodium phosphite in the presence of an acid-binding agent such as pyridine.

The following examples, which illustrate the application of the invention to this reaction, are for purposes of illustration only and are not to be regarded as limitations upon the scope of the invention:

*Example 1.*—To an agitated suspension of 63 g. (0.5 mol) disodium phosphite in 139 g. (1.1 mols) dimethyl sulfate, was added dropwise over a period of about 3 minutes, 8 g. (0.1 mol) pyridine. The charge temperature rose from 30° C. to 50° C. The reactor was warmed in a hot water bath. At 85° C., the amount of suspended solid appeared to increase. This was accompanied by a sudden rise of the charge temperature to a maximum of 160° C. At the higher temperature the charge appeared to become a homogeneous liquid and evolution of vapors resulted in a reflux of liquid. The temperature dropped quite rapidly and at about 85° C. a solid began to separate again. Total reaction time was about one-half hour. The reaction mixture was subjected to distillation at 10 mm. Hg absolute pressure. A total of 36 g. liquid was collected. According to infrared analysis, the distillate was a mixture of about 32 g. dimethyl hydrogen phosphite and 4 g. dimethyl sulfate. Basis disodium phosphite employed, the 32 g. represents a yield of 58% of theory.

*Example 2.*—The reaction procedure of Example 1 was repeated with the same quantities and reagents. However, after the reaction temperature had subsided from a maximum of about 160° C., it was allowed to drop to 65° C. At this point, 110 cc. of methanol was slowly added over a period of about 10 minutes, with good agitation. The stirred mixture was cooled to 10° C. and filtered. The precipitate was washed with 100 cc. of cold methanol. The combined filtrate and wash liquid was stripped of methanol at a pressure slightly below atmospheric by means of an aspirator. During the methanol stripping some solid again separated. The still residue after removal of the methanol was subjected to distillation at 10 mm. Hg and 36 g. distillate was collected over a boiling range of 55–69° C. (B. P. at 10 mm. Hg of dimethyl hydrogen phosphite=55–58° C. of dimethyl sulfate 69–75° C.) Infrared analysis showed the 36 g. distillate to be a mixture of 33 g. dimethyl hydrogen phosphite and 3 g. dimethyl sulfate. Basis disodium phosphite employed, the 33 g. represents a 60% yield of dimethyl hydrogen phosphite.

*Example 3.*—To an agitated suspension of 63 g. (0.5 mol) disodium phosphite and 76 g. (0.6 mol) dimethyl sulfate, was added, over a period of 3 minutes, 8 g. (0.1 mol) pyridine. This was accompanied by a temperature rise from 26–57° C. After being heated to 85° C., an exothermic reaction set in, taking the charge temperature to 120° C. maximum. When the temperature began to subside the mixture was heated up to 145–155° C. and held there for 1.5 hours. The product was distilled directly from the reaction mixture at 10 mm. Hg pressure. A total of 23 g. distillate was collected. Infrared analysis showed the product to be good quality dimethyl hydrogen phosphite, free of dimethyl sulfate. Basis disodium phosphite employed, the 23 g. of dimethyl hydrogen phosphite represents a yield of 42%.

We claim:
1. The process for making a dialkyl phosphite which comprises reacting dialkyl sulfate with an alkali metal monohydrogen phosphite in the presence of pyridine.
2. The process of claim 1 wherein reaction is carried out at temperatures between about 30° and about 200° C.
3. The process for making dimethyl hydrogen phosphite which comprises reacting dimethyl sulfate with an alkali metal monohydrogen phosphite in the presence of pyridine.
4. The process of claim 3 wherein reaction is effected at temperatures between about 30° C. and about 200° C.
5. The process of claim 3 wherein the alkali metal monohydrogen phosphite is disodium phosphite.
6. The process of claim 5 wherein the reaction is effected primarily at temperatures between about 70° C. and about 160° C.
7. The process for making dimethyl hydrogen phosphite which comprises gradually adding pyridine to an agitated suspension of disodium phosphite in dimethyl sulfate in a ratio of about 2 mols of dimethyl sulfate for each mol of disodium phosphite, thereafter raising the temperature of the mixture to between about 70° C. and about 160° C. for about one-half hour, and distilling off in vacuo the dimethyl hydrogen phosphite product.

References Cited in the file of this patent

FOREIGN PATENTS 631,549    Great Britain _____ Nov. 4, 1949

OTHER REFERENCES

Groggins-Unit Processes in Organic Synthesis 3d ed. pgs. 566–567 (1947).

Kosolapoff-Organo-Phosphorus Compounds, pgs. 189–190 (1950).

Karrer Organic Chemistry (4th ed.) Elsevier Publ. Co. 1950 (N. Y.) p. 431.